June 30, 1942.    E. KRUMSIEK ET AL    2,287,889
LOCK JOINT COUPLING
Filed Dec. 3, 1940
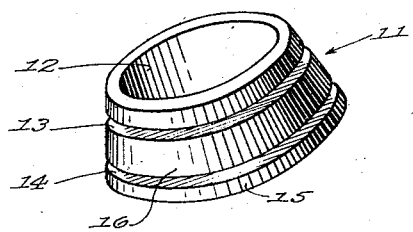
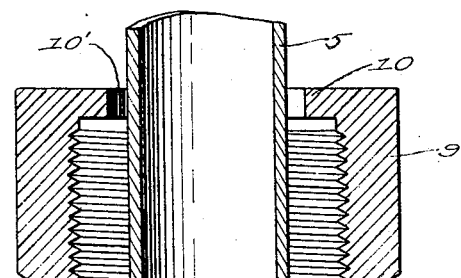
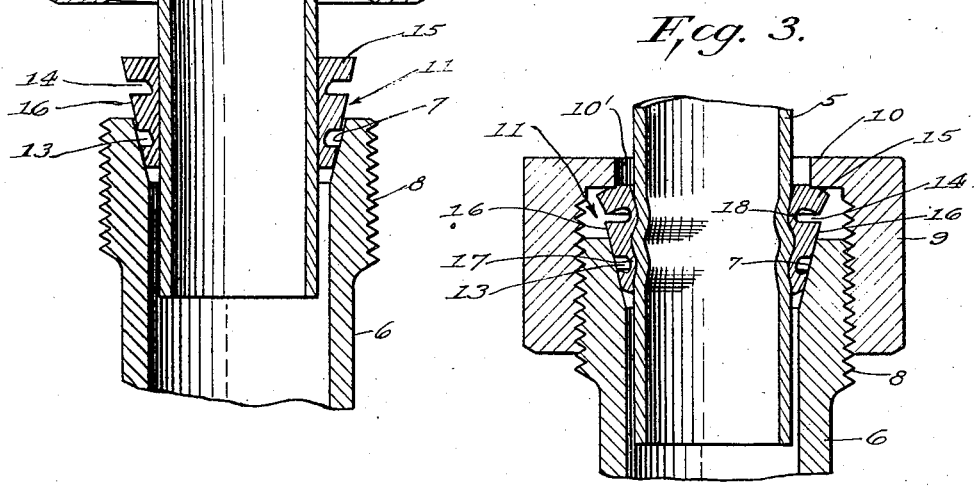
Inventors
Ernest Krumsiek &
Ray Kileen Patented June 30, 1942

2,287,889

UNITED STATES PATENT OFFICE 2,287,889

LOCK JOINT COUPLING

Ernest Krumsiek and Ray Kileen, Decatur, Ill., assignors to Mueller Co., Decatur, Ill., a corporation of Illinois Application December 3, 1940, Serial No. 368,401

3 Claims. (Cl. 285—166)

This invention relates to lock joint couplings including an improved form of compression element. In general, the object of the invention is to provide an improved joint which is leakproof and wherein the joined members are securely locked against separation.

There is at present a growing demand for supply pipes, preferably made of copper or the like, which can be easily bent to accommodate fittings which may be somewhat out of proper location. In such a situation, one end of the supply pipe can be connected, for example, to a wall or floor fitting and the pipe bent so that its other end can be inserted in the shank of a faucet or other element even though the latter may be substantially out of alignment with the fitting. With such an arrangement, it is important that the pipe be securely positioned and besides, many plumbing codes prohibit the use of a slip joint connection. The coupling of the present invention is designed to meet all requirements in a particularly effective manner.

The invention is shown in illustrative and practical embodiment in the accompanying drawing with reference to which description will proceed.

In the drawing:

Figure 1 shows, in perspective, a compression ring in accordance with the present invention, Figure 2 shows the ring and other elements of the joint in axial section in process of assembly, and Figure 3 shows the completed joint in axial section.

Referring to the drawing, reference numerals 5 and 6 designate two telescoped portions which are to be locked together, the portion 5 being the end of a deformable section of pipe, such as copper tubing, and the portion 6 being part of any appropriate fitting such as a wall or floor fitting, faucet shank, and the like. Portion 6 has a conical mouth 7 whose elements are at a 15° angle to the axis of the conical surface, this being a usual provision in fittings of the type under contemplation. However, where the flared mouth is absent, it may be readily provided. The thickened end of portion 6 is provided with external threads 8.

Reference numeral 9 designates a conventional coupling nut engageable with the threads 8 and including an internal flange 10 defining a circular opening 10' of somewhat larger diameter than the diameter of member 5.

Reference numeral 11 designates generally the new compression ring. This ring has a cylindrical opening 12 of a diameter to receive the end of member 5 with a fairly close sliding fit. The ring is formed as the frustum of a cone whose elements, as here shown, are at a 12° angle to its axis. In other words, the angle of element 11 is less than the angle of the conical mouth 7, in the present instance, by 3°. Element 11 is provided with a plurality of circumferential outside grooves 13 and 14, the latter being deeper than the former so that both grooves terminate at about the same distance from the walls of the opening 12. The provision of the groove 14 results in an overhang, or undercut portion, 15 at the large end of the ring.

In Figure 2, the ring 11 is shown as embracing portion 5 near the end of the latter with its small end received in the flare 7 of portion 6, groove 13 being within and groove 14 without the flare.

When the nut 9 is now engaged with the threads 8 and threaded home, the ring 10 through longitudinal compression is tightly wedged in the mouth 7 and by the time the portion 16, which is between grooves 13 and 14, has come into tight engagement with the flared surface of the mouth, the ring portion 17, in the zone of groove 13, has been circumferentially collapsed inwardly, creating a mating circumferential indentation in the walls of member 5, Figure 3. This is due to the fact that when the nut is tightened, the lower or inner extremity of the compression member can move little if any further inwardly of the mouth from the position shown in Figure 2 whereas, due to the difference in angle between the ring and the mouth, the ring portion 16 can move inwardly to a substantial extent. To accommodate this latter movement, zone 17 must buckle inwardly to the relation shown in Figure 3. The zone 16 of the ring is now tightly wedged in the flared mouth and rigidly backs portion 5 above the buckling zone 17, portion 5 being also rigidly backed by the ring portion below the zone 17. A rigid fluid tight interlock is thus secured.

The compressive force of nut 9 is transmitted to the ring through overhang 15 radially outwardly of the inner end of groove 14 with upsetting effect and consequently collapses the ring circumferentially inwardly at 18 in the zone of groove 14 so that a mating circumferential indentation is formed in the walls of portion 5. Thus, a second fluid tight interlock is provided between portion 5 and the compression ring. In Figure 3 the groove 14 is still open to a substantial extent although in actual practice it frequently becomes completely closed with a consequent greater radial range of inward collapse at zone 18. A most effective fluid tight interlock is secured in all cases.

It will be seen that the new joint is composed of standard parts outside of the compression element 11 and this is in itself a valuable feature. Element 11 is easily fashioned of suitably deformable material such as brass or the like.

It will, of course, be understood that the invention is not necessarily limited to the precise form of parts illustrated and that we do not limit ourselves to the illustrative disclosure herein except as in the following claims.

We claim:

1. A joint comprising two tubular portions in telescoped relation, the inner portion being deformable and the outer portion having a conical outwardly enlarged mouth, a conical compression ring of smaller angle than said mouth received in and having an external annular groove within the latter, said compression ring surrounding said inner member, and a nut threaded on said outer portion engaging and wedging said ring in said mouth and collapsing said ring circumferentially inwardly in the zone of said groove whereby a mating circumferential indentation is formed in said inner portion.

2. A joint comprising two tubular portions in telescoped relation, the inner portion being deformable and the outer portion having a conical outwardly enlarged mouth, a conical compression ring having a portion in said mouth and a portion outwardly of the latter, said outward portion of said ring being provided with a circumferential groove whereby a circumferential overhang is provided, said ring surrounding said inner member, and a nut threaded on said outer portion and having an internal flange engaging said overhang and collapsing said compression ring circumferentially inwardly in the zone of said groove whereby a mating circumferential indentation is formed in said inner portion.

3. A joint comprising two tubular portions in telescoped relation, the inner portion being deformable and the outer portion having a conical outwardly enlarged mouth, a conical compression ring of smaller angle than said mouth received in and having an external annular groove within the latter, said compression ring surrounding said inner member, said ring having a portion outwardly of said mouth provided with a circumferential groove whereby a circumferential overhang is provided, said ring surrounding said inner member, and a nut threaded on said outer portion and having an internal flange engaging said overhang and wedging said ring in said mouth and collapsing said ring circumferentially inwardly in the zones of said grooves whereby mating circumferential indentations are formed in said inner portion.

ERNEST KRUMSIEK.
RAY KILEEN.